(12) United States Patent
Song et al.

(10) Patent No.: US 12,240,601 B2
(45) Date of Patent: Mar. 4, 2025

(54) MORPHING STRUCTURES WITH LIGHT-RESPONSIVE POLYMERS

(71) Applicant: Toyota Motor Engineering & Manufacturing North America, Inc., Plano, TX (US)

(72) Inventors: Yuyang Song, Ann Arbor, MI (US); Shailesh N. Joshi, Ann Arbor, MI (US); Danil V. Prokhorov, Canton, MI (US); Umesh N. Gandhi, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 139 days.

(21) Appl. No.: 18/084,833

(22) Filed: Dec. 20, 2022

(65) Prior Publication Data
US 2024/0199206 A1     Jun. 20, 2024

(51) Int. Cl.
| | |
|---|---|
| *B64C 31/06* | (2020.01) |
| *F03D 5/00* | (2006.01) |
| *F03D 7/00* | (2006.01) |
| *F03D 9/25* | (2016.01) |
| *F03D 80/60* | (2016.01) |

(52) U.S. Cl.
CPC ............ *B64C 31/06* (2013.01); *F03D 5/015* (2023.08); *F03D 7/00* (2013.01); *F03D 9/25* (2016.05); *F03D 80/60* (2016.05); *F05B 2240/921* (2013.01); *F05B 2280/4003* (2013.01); *F05B 2280/5006* (2013.01)

(58) Field of Classification Search
CPC ....... B64C 31/06; B64C 39/022; B64C 13/00; B64C 2031/065; F03D 5/00; F03D 5/015; F03D 7/00; F03D 7/015; F05B 2240/921
See application file for complete search history.

(56) References Cited

U.S. PATENT DOCUMENTS

| | | | |
|---|---|---|---|
| 10,734,943 B2 * | 8/2020 | Frantz | ............. H02S 10/00 |
| 2010/0117371 A1 | 5/2010 | Ippolito et al. | |
| 2011/0042524 A1 * | 2/2011 | Hemmelgarn | ...... B64C 3/48 |
| | | | 244/203 |

(Continued)

FOREIGN PATENT DOCUMENTS

| | | | |
|---|---|---|---|
| CN | 117984636 A | * | 5/2024 |
| JP | 2018127759 A | | 8/2018 |

OTHER PUBLICATIONS

Translation of CN 117984636 A (Year: 2024).*

(Continued)

*Primary Examiner* — Richard Green
*Assistant Examiner* — Colin Zohoori
(74) *Attorney, Agent, or Firm* — Christopher G. Darrow; Darrow Mustafa PC

(57) ABSTRACT

A morphing aerodynamic structure includes a body with an outer covering, a bridle attached to the body, and a light-response polymer disposed on at least one of the outer covering and the bridle. The light-responsive polymer is configured to change shape when illuminated with a laser such that at least one of an angle of attack, roll, pitch and yaw of the morphing aerodynamic structure is at least partially controlled without the use of a mechanical or pneumatic control unit.

17 Claims, 8 Drawing Sheets

(56) References Cited

U.S. PATENT DOCUMENTS

2021/0262442 A1    8/2021  Sia
2022/0389904 A1*  12/2022  Reiners .................. H02K 7/183

OTHER PUBLICATIONS

Siefert et al. "Programming stiff inflatable shells from planar patterned fabrics," Soft Matter, issue 34, Jul. 14, 2020, 20 pages.
Huang et al. "Light-Responsive Soft Actuators: Mechanism, Materials, Fabrication, and Applications," Actuators, vol. 10, issue 11, Nov. 10, 2021, 22 pages.
Li et al. "Ground and geostationary orbital qualification of a sunlight-stimulated substrate based on shape memory polymer composite," Smart Materials and Structures, vol. 28, Jun. 6, 2019, 15 pages.

\* cited by examiner

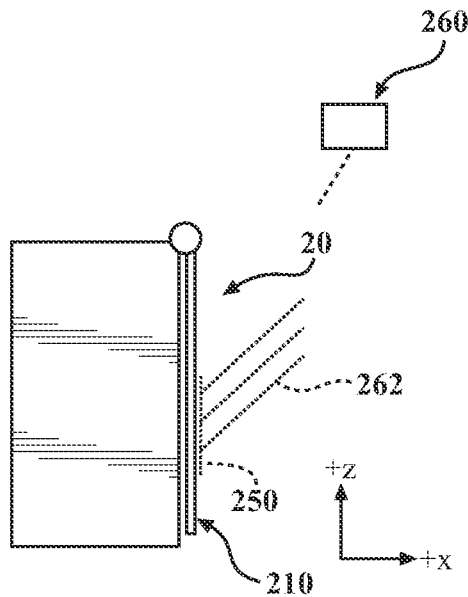 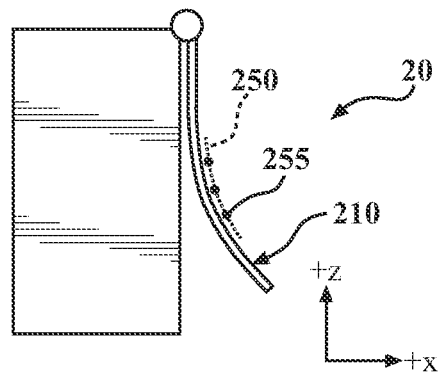
FIG. 3A            FIG. 3B
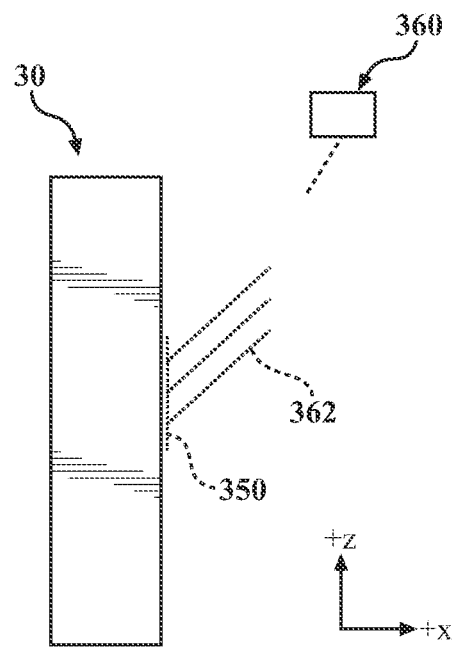 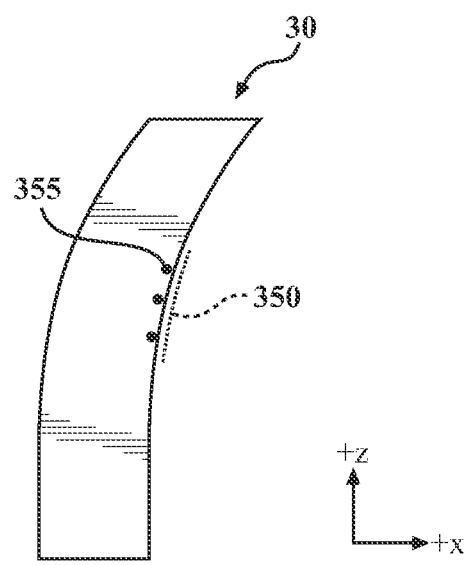
FIG. 4A            FIG. 4B

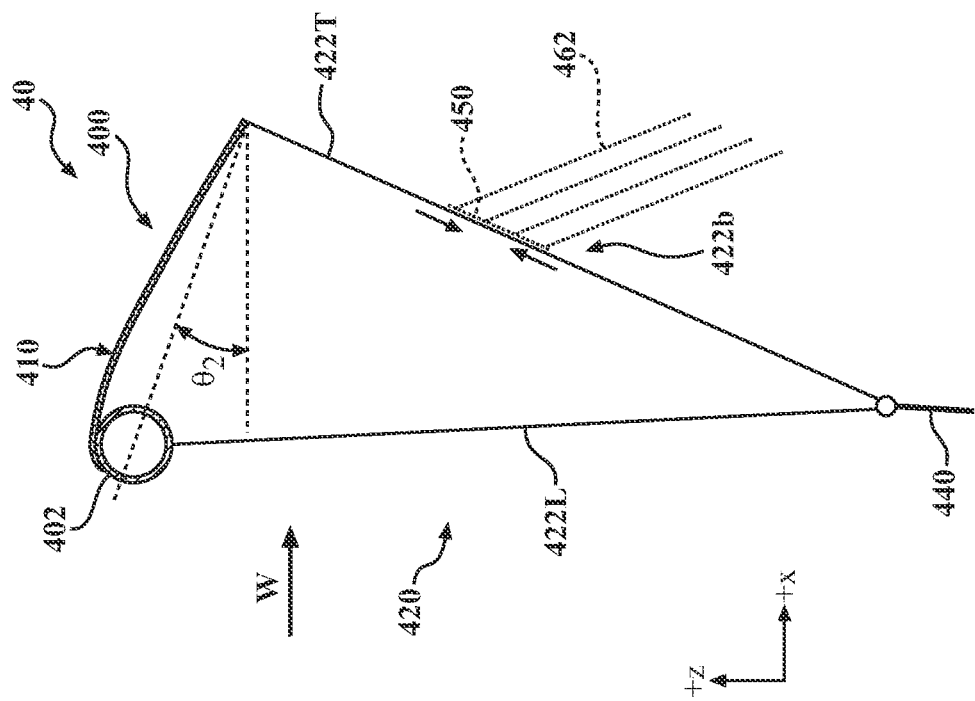
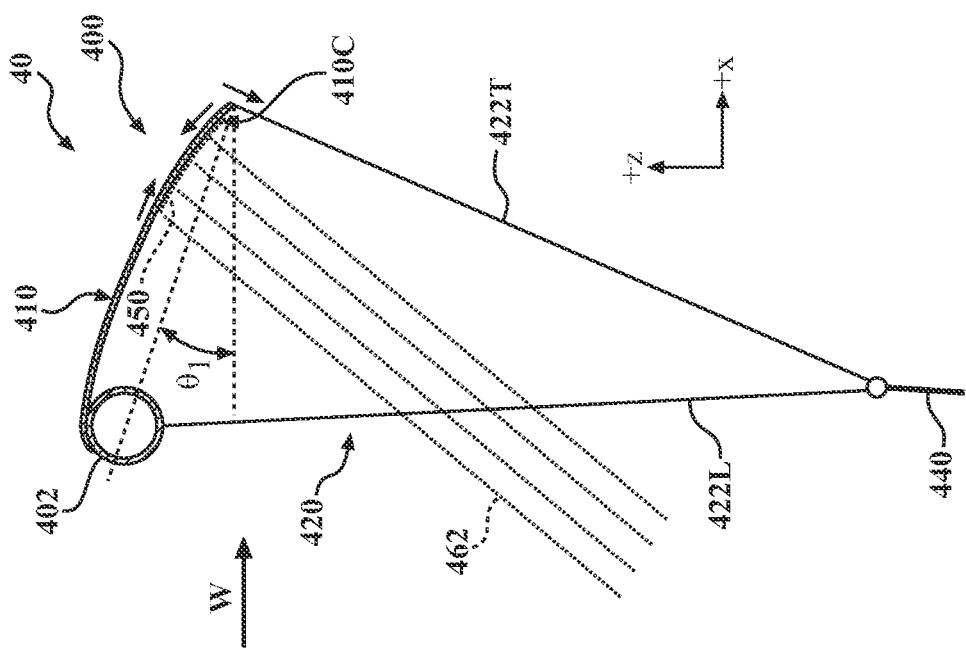
FIG. 6A
FIG. 6B

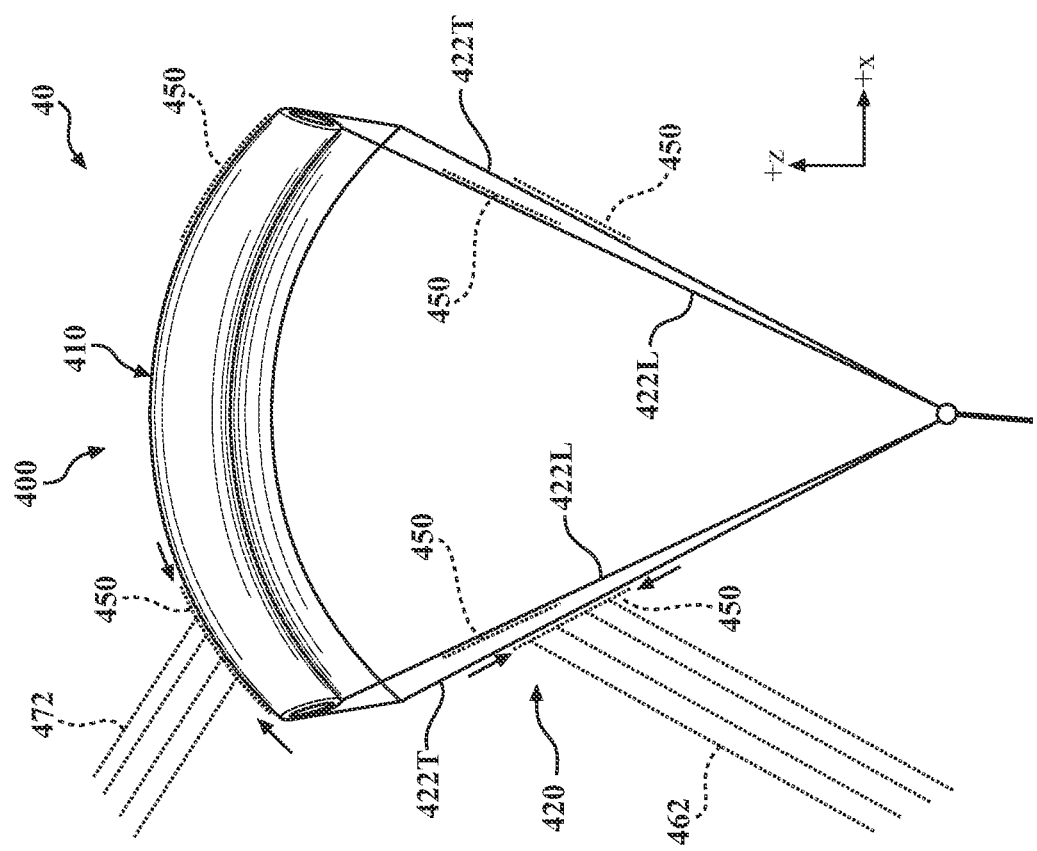
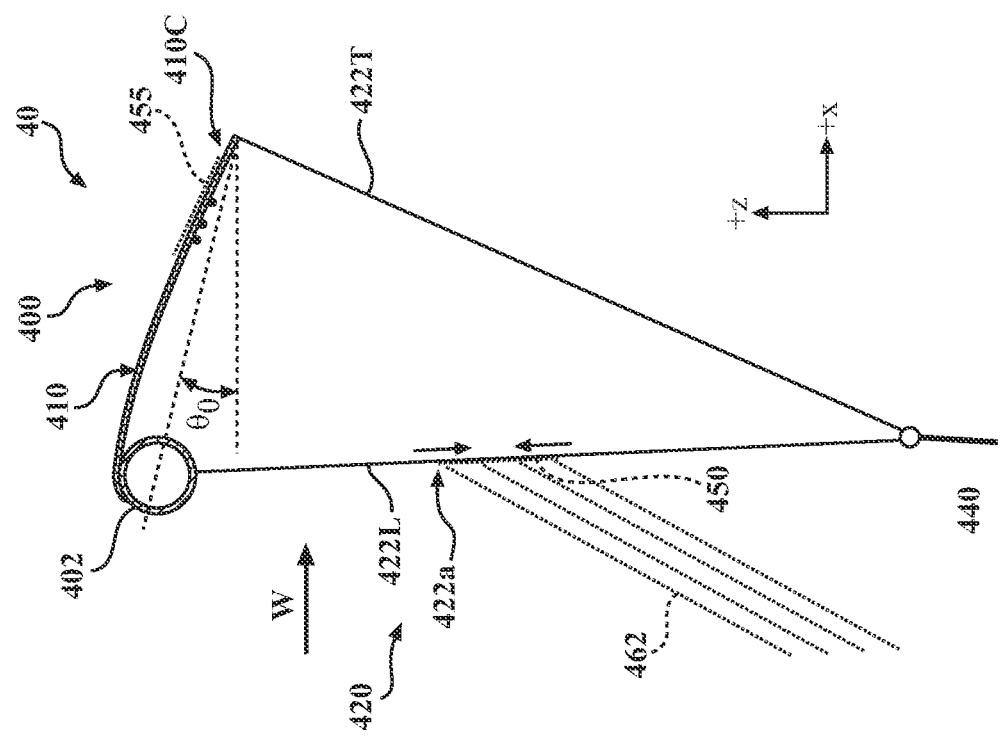

US 12,240,601 B2

MORPHING STRUCTURES WITH LIGHT-RESPONSIVE POLYMERS

TECHNICAL FIELD

The present disclosure generally relates to air morphing structures, and particularly to morphing structures for energy generation.

BACKGROUND

Morphing aerodynamic structures such as high-altitude kites for power generation typically include a kite connected to a ground-based or ground-secured electric generator with a tether. Wind, particularly wind in high-altitude jet streams, pushes the kite through the air and unwinds the tether from the electric generator to generate electricity. In addition, a control unit attached to a bridle of the kite is used to control the kite such that it flies in a figure-eight pattern during an unwinding phase of the tether. However, the control unit adds weight to and thereby reduces the efficiency of the kite.

The present disclosure addresses the issue of controlling morphing aerodynamic structures such as high-altitude kites, and other issues related to morphing structures.

SUMMARY

In one form of the present disclosure, a morphing aerodynamic structure includes a body with an outer covering, a bridle attached to the body, and a light-response polymer disposed on at least one of the outer covering and the bridle. The light-responsive polymer is configured to change shape when illuminated with a laser such that at least one of an angle of attack, roll, pitch and yaw of the morphing aerodynamic structure is controlled when the light-responsive polymer is illuminated with the laser.

In another form of the present disclosure, a morphing aerodynamic structure includes a body with an outer covering, a bridle attached to the body, and a light-response polymer disposed on at least one of an outer surface and an inner surface of the outer covering such that an angle of attack, roll, pitch and/or yaw of the morphing aerodynamic structure is controlled when the light-responsive polymer is illuminated with a laser.

In still another form of the present disclosure, a morphing aerodynamic structure includes a body with an outer covering, a bridle attached to the body, a light-response polymer disposed on at least one of an outer surface and an inner surface of the outer covering, and a land-based laser configured to illuminate the light-responsive polymer with the laser. Illumination of the light-responsive polymer changes a shape of the outer covering and/or bridle such that an angle of attack, roll, pitch, and/or yaw of the morphing aerodynamic structure is controlled.

These and other features of the fuel cells will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 3A shows a side view of a morphing structure with a light-responsive polymer according to one form of the present disclosure;
FIG. 3B shows the morphing structure in FIG. 3A with the light-responsive polymer in an activated state;
FIG. 4A shows a side view of a morphing structure with a light-responsive polymer according to another form of the present disclosure;
FIG. 4B shows the morphing structure in FIG. 4A with the light-responsive polymer in an activated state;
FIG. 6A shows the morphing aerodynamic structure in FIG. 5 with a light-responsive polymer on an outer covering being activated with a laser;
FIG. 6B shows the morphing aerodynamic structure in FIG. 5 with a light-responsive polymer on a bridle cord being activated with a laser;
FIG. 6C shows the morphing aerodynamic structure in FIG. 5 with a light-responsive polymer on another bridle cord being activated with a laser;
FIG. 6D shows a front view of the morphing aerodynamic structure in FIG. 5 with a light-responsive polymer on an outer covering and a light-responsive polymer on a bridle cord being activated by lasers.

It should be noted that the figures set forth herein are intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides a structure with a light-responsive polymer disposed thereon such that morphing of the structure is provided when the light-responsive polymer is activated by a light source. Stated differently, a morphing structure configured to change shape during use via activation of a light-responsive polymer disposed thereon is provided by the teachings of the present disclosure.

In one form of the present disclosure, the morphing structure is a morphing aerodynamic structure such as a high-altitude kite (also referred to herein simply as "kite") tethered to a ground-station electric generator (also referred to herein simply as "generator"). And flying and unwinding the kite from the generator generates electricity. The kite includes a body with an outer covering and a bridle attached to the body. And instead of controlling an angle of attack, roll, pitch, and/or yaw of the kite using a control unit that controls the bridle, a light source is used to activate one or more areas with a light-responsive polymer disposed thereon such that the outer covering and/or cords of the bridle change shape and/or dimension and the angle of attack, roll, pitch, and/or yaw of the kite are at least partially controlled without a control unit. In this manner, morphing aerodynamic structures having less weight and enhanced efficiency than traditional morphing aerodynamic structures are provided.

Figure 1A:
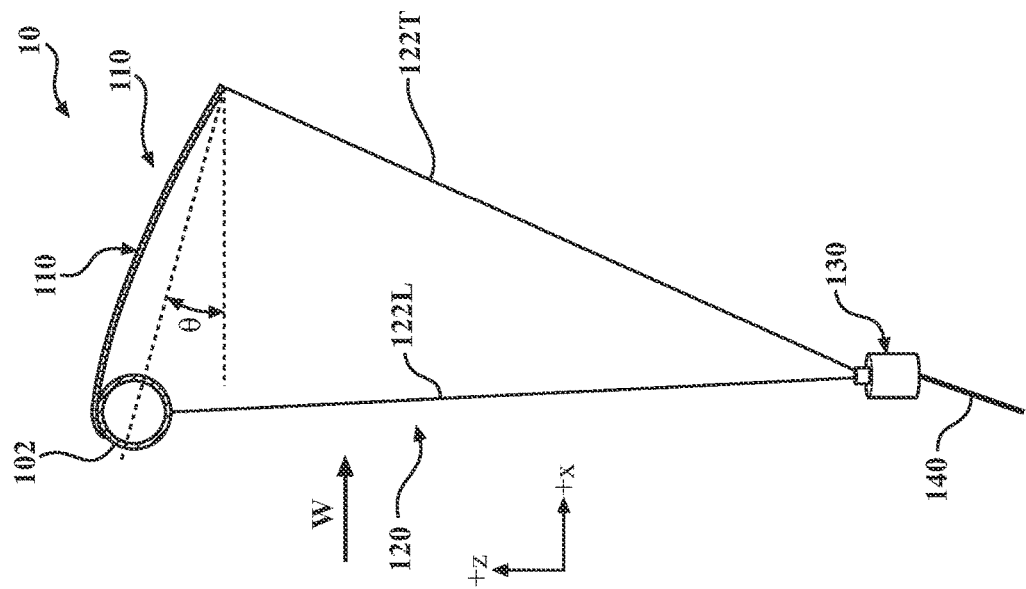
FIG. 1A shows a perspective view of high-altitude kite.
Figure 1B:
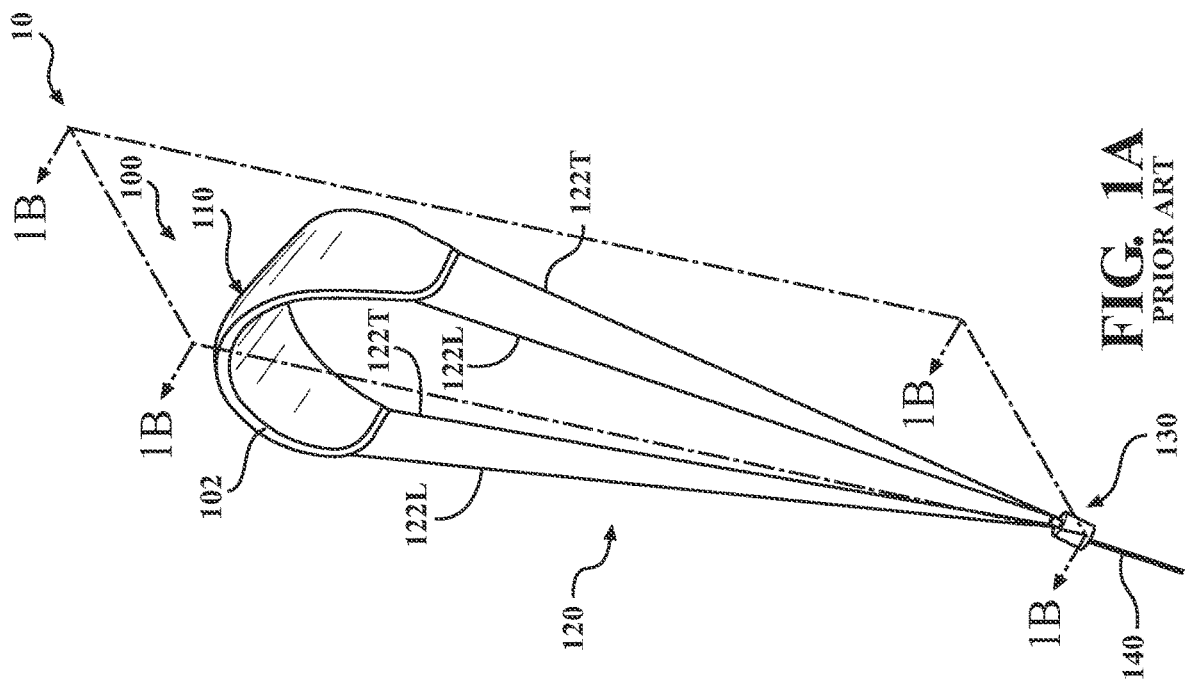
FIG. 1B shows a side cross-section view of FIG. 1A.

Referring now to FIGS. 1A-1B, a perspective view of a morphing aerodynamic structure 10 is shown in FIG. 1A and a sectional view of section 1B-1B in FIG. 1A is shown in FIG. 1B. The morphing aerodynamic structure 10 includes a body 100 with an outer covering 110 (e.g., a fabric canopy) and a bridle 120 attached to the body 100. In some variations, the body 100 includes an inflated tubular frame (not labeled) with a bow-shaped leading edge tube 102. The leading edge tube 102 of the body 100 is supported by leading edge cords 122L and a trailing edge (+x direction) of the outer covering 110 is supported by trailing edge cords 122T.

The bridle 120 extends from the body 100 to a control unit 130 configured to change a length of one or more of the cords 122L, 122T. For example, in some variations the control unit 130 includes motors, winch drums, and a break such that the cords 122T. 122L can be winched in to reduce the length thereof and winched out to increase the length thereof.

In some variations, the morphing aerodynamic structure 10, and other morphing structures disclosed herein, can include one or more sensors (not shown) configured to detect, measure, and send signals related to environmental conditions (e.g., temperature, humidity, wind speed and direction, among others) and/or morphing aerodynamic structure conditions (e.g., GPS location, elevation, azimuth angles of the tether, traction force on the tether, among others). In addition, the control unit 130 can include one or more computers for communication with the sensors and/or a ground station (not shown), and for motor control of the motors, winch drums, and break.

During operation of the morphing aerodynamic structure 10, wind 'W' blowing through the atmosphere exerts a "traction force" on the outer covering 110 such that the body 100 seeks or desires to move in the +x and +z directions, and a tether 140 transfers the traction force to a ground station (not shown). In some variations, the control unit 130 controls or changes the lengths of the cords 122L, 122T such that an angle of attack θ of the body changes and lift (+z force) of the kite increases or decreases. As used herein, the phrase "angle of attack" refers to an average angle between the outer covering 110 and a direction of the wind Was illustrated in the figures. And in at least one variation, the control unit 130 changes the length of the cords 122L, 122T such that an angle of attack, roll, pitch, and/or yaw of the body 100 are controlled and a desired flight path of the morphing aerodynamic structure 10 is provided.

Figure 2A:
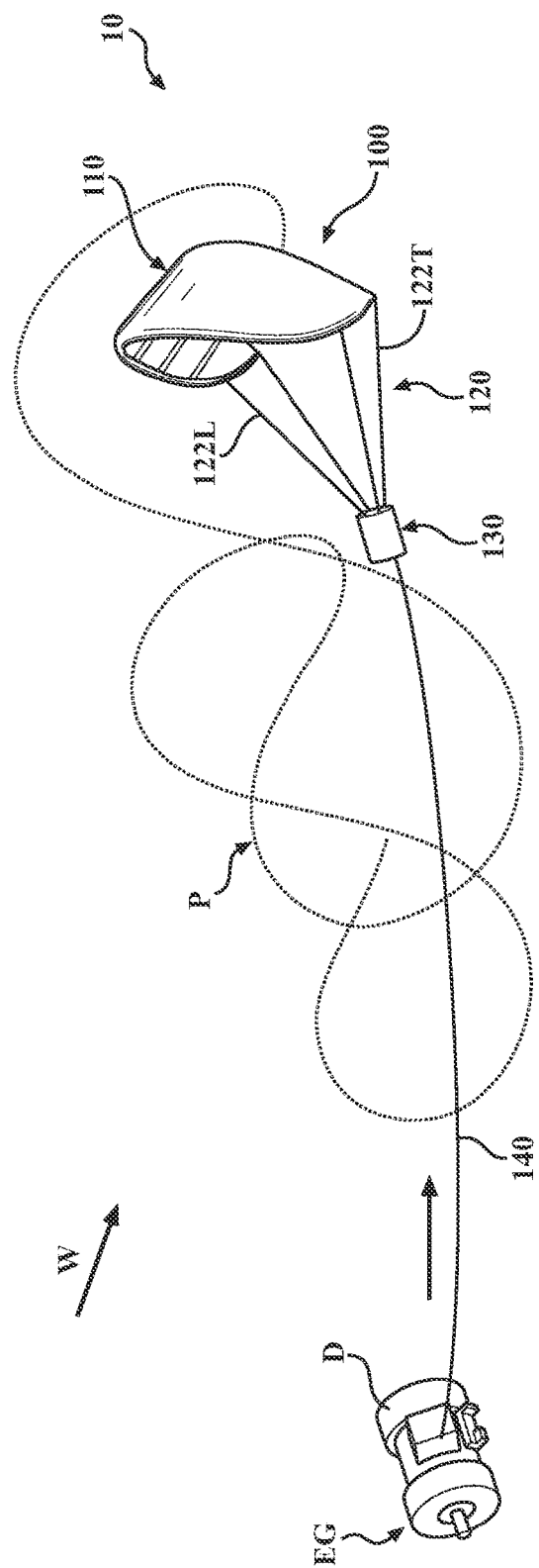
FIG. 2A shows the high-altitude kite in FIG. 1A tethered to a ground-station electric generator during a reel-out stage.
Figure 2B:
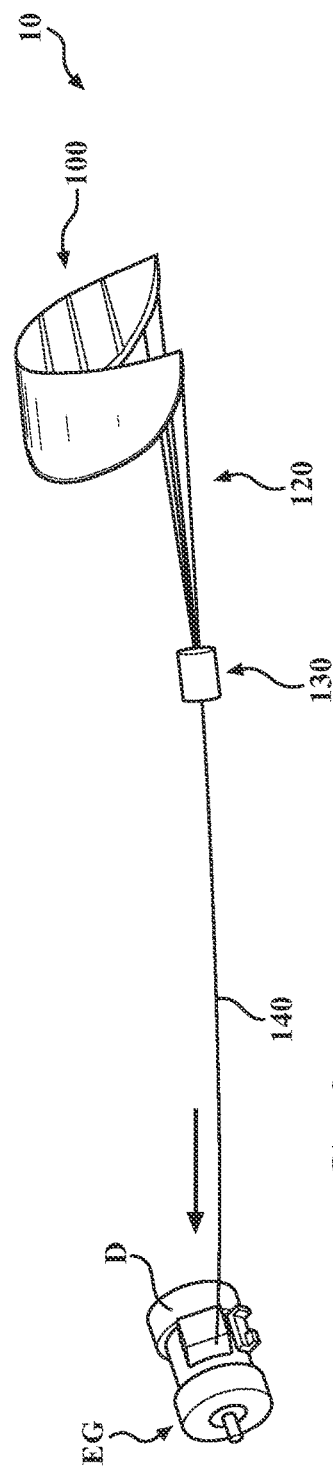
FIG. 2B shows the high-altitude kite in FIG. 2A during a reel-in stage.

For example, and with reference to FIGS. 2A-2B, the morphing aerodynamic structure 10 is attached to a ground-station electric generator 'EG' with the tether 140, the tether is wound around a drum 'D' of the electric generator EG, and the force of the wind on the body 100 results in a traction force that simultaneously unwinds the tether 140, turns the drum D, and generates electricity. In addition, by controlling the lengths of the cords 122L, 122T, the control unit 130 controls the angle of attack, roll, pitch, and/or yaw of the body 100 such that the morphing aerodynamic structure 10 flies in a general figure-eight pattern 'P'. The morphing aerodynamic structure 10 is allowed to fly and unwind the tether 140 from the drum D until a desired amount of the tether 140 is unwound and/or a desired amount of electricity is generated by the electric generator EG. Thereafter, i.e., after the "reel-out" stage, the control unit 130 controls the length of the cords 122L, 122T such that the angle of attack of the body 100 is reduced and the electric generator EG winds the tether 140 back onto the drum D during a "reel-in" stage illustrated in FIG. 2B. The energy consumption of the reel-in stage is less than the energy production of the reel-out stage such that a net energy increase is provided and stored in a battery cell and/or provided to a power grid. However, the control unit 130 uses a mechanical winch system to change the lengths of the cords 122L, 122T, and the weight of the mechanical winch system is undesirable.

Referring now to FIGS. 3A-3B, a morphing structure 20 according to one form of the present disclosure is shown. In some variations, the morphing structure 20 is a morphing aerodynamic structure, while in other variations the morphing structure 20 is not a morphing aerodynamic structure. And in at least one variation the morphing structure 20 does not include a control unit attached thereto. For example, the morphing structure 20 includes an outer covering 210 with a light-responsive polymer 250 disposed thereon such that illumination (activation) of the light-responsive polymer 250 with light 262, e.g., a laser beam (also referred to herein simply as "laser"), from an artificial light source 260 (i.e., not light from the sun) contracts (shrinks) the light-responsive polymer 250. In addition, an area of the outer covering 210 where the light-responsive polymer 250 is disposed changes shape without the use of a mechanical or pneumatic system as illustrated in FIG. 3B.

The light-responsive polymer 250, and other light-responsive polymers disclosed herein, is configured to be activated when illuminated with light having a predefined light wavelength and/or a predefined range of light wavelengths. For example, in some variations the light-responsive polymer 250 is configured to change shape (e.g., shrink/contract or expand) when illuminated with a light having wavelengths within the UV light range, while in other variations the light-responsive polymer 250 is configured to change shape when illuminated with a light having wavelengths within the IR light range. And in at least one variation, the light-responsive polymer 250 is configured to change shape when illuminated with light having an intensity above a predefined threshold. In this manner the light-responsive polymer 250 can be activated independent of surrounding or ambient light such as light from the sun, indoor home lighting, indoor office lighting, and/or indoor factory lighting, among others.

In some variations, the light-responsive polymer 250, and other light-responsive polymers disclosed herein, is configured to return to an original shape. For example, in some variations the light-responsive polymer 250, after being activated by the light 262, returns to its original shape after being heated above a de-activation temperature. That is, the light-responsive polymer 250 has a de-activation temperature above which the material relaxes and recovers deformation that occurs during and after being illuminated with the light 262. And in such variations, the morphing structure 20 can include one or more heating elements 255 (FIG. 3B) configured to heat the light-responsive polymer 250 above its de-activation temperature such that the outer covering 210 returns to its original shape (FIG. 3A).

Non-limiting examples of the light-responsive polymer 250, and other light-responsive polymers disclosed herein, include azobenzene-based polymers, triphenylmethane-based polymers, spiropyran-based polymers, polypeptidebased polymers, thermoplastic polyurethane polymers, among others. In addition, non-limiting examples of de-activation temperatures for the light-responsive polymer 250, and other light-responsive polymers disclosed herein, include temperatures equal to about 25° C., 30° C., 40° C., 50° C., and temperatures in between the values list, among others.

Referring to FIGS. 4A-4B, a morphing structure 30 according to another form of the present disclosure is shown. Particularly, the morphing structure 30 is an inflatable morphing structure with an outer covering 310 and a light-responsive polymer 350 disposed thereon. And illumination (activation) of the light-responsive polymer 350 with light 362 from an artificial light source 360 as illustrated in FIG. 4A contracts (shrinks) the light-responsive polymer 350 and changes the shape of the outer covering 310 as illustrated in FIG. 4B. Accordingly, the outer covering 310 changes shape as shown in FIG. 4B without the use of a mechanical or pneumatic system.

In some variations, the light-responsive polymer 350 is configured to return to its original shape. And in such variations, the morphing structure 30 can include one or more heating elements 355 (FIG. 4B) configured to heat the light-responsive polymer 350 above its de-activation temperature.

Figure 5:
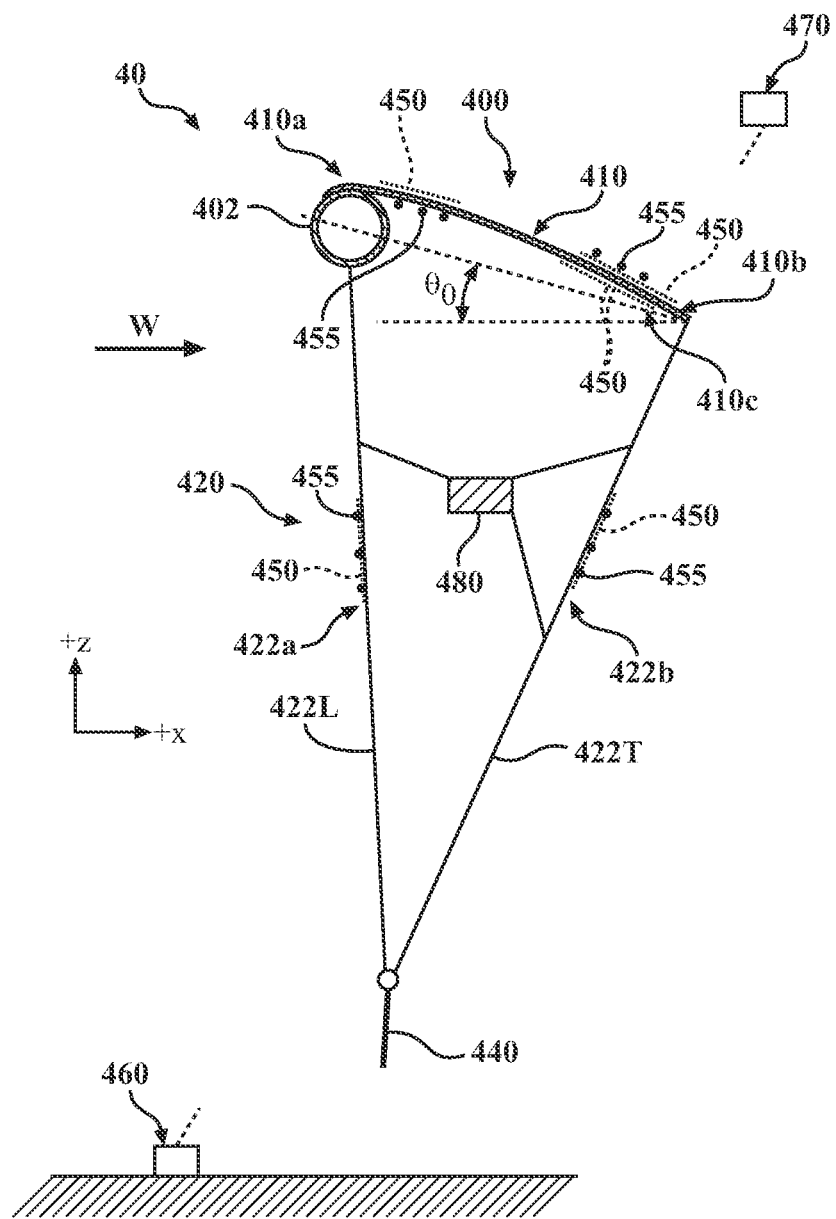
FIG. 5 shows a side view of a morphing aerodynamic structure according to the teachings of the present disclosure.

Referring to FIG. 5, a morphing aerodynamic structure 40 according to still another form of the present disclosure includes a body 400 with a bow-shaped leading edge tube 402, an outer covering 410, a bridle 420 with a plurality of cords 422L, 422T attached to the body 400, and a light-responsive polymer 450 disposed on the outer covering 410 and/or the cords 422L, 422T. In some variations, the light-responsive polymer 450 is disposed on specific areas of the outer covering 410 (e.g., areas 410a, 410b, 410c, among others) and/or specific lengths or areas of the cords 422L, 422T (e.g., areas 422a, 422b, among others), while in other variations the light-responsive polymer 450 is disposed on an entirety of the outer covering 410 and/or the cords 422L, 422T. And in at least one variation, the outer covering 410 and/or one or more of the cords 422L, 422T is made from the light-responsive polymer 450.

The light-responsive polymer 450 is configured to change shape when activated or illuminated by a predefined light source, e.g., an on-board LED, an on-board laser, and/or an off-board laser, which in turn changes the shape of the outer covering 410 and/or cord(s) 422L, 422T where the light-responsive polymer 450 is present. In some variations, the light-responsive polymer 450 shrinks (decreases in volume) when activated by a predefined light wavelength or pre-defined range of light wavelengths, while in other variations the light-responsive polymer 450 expands (increases in volume) when activated by a predefined light wavelength or predefined range of light wavelengths.

As used herein, the term "on-board" refers to a light source attached to the morphing aerodynamic structure 40 and the term "off-board" refers to a light source not attached to the morphing aerodynamic structure 40. For example, in some variations a ground-based laser 460 and/or an air-based laser 470 (e.g., a balloon-based laser) is used to illuminate one or more areas of the light-responsive polymer 450. In the alternative, or in addition to, an optional on-board laser 480 is used to illuminate one or more areas of the light-responsive polymer 450.

Similar to the morphing structures 20 and 30 discussed above, in some variations the morphing aerodynamic structure 40 can include one or more heating elements 455 configured to heat the light-responsive polymer 450 above its de-activation temperature such that the light-responsive polymer 450, and a respective area 410a, 410b, 410c, 422a, 422b on which the light-responsive polymer 450 is disposed, return to its original shape when heated above the de-activation temperature.

Referring now to FIGS. 6A-6D, non-limiting examples of a light source activating the light-responsive polymer 450 and changing the shape of outer covering 410 and/or one or more of the cords 422L, 422T of the morphing aerodynamic structure 40 in FIG. 5 are shown. Referring particularly to FIG. 6A, light 462 from a light source (e.g., light source 460) is illustrated illuminating the area 410c, and such illumination activates and contracts (shrinks) the light-responsive polymer 450 on the area 410c such that the outer covering 410 contracts inwardly (−x/−z direction) and the angle of attack θ increases from $θ_o$ (FIG. 5) to $θ_1$.

Referring to FIG. 6B, light 462 from a light source (e.g., light source 460) is illustrated illuminating the area 422b on the cord 422T and such illumination activates and contracts (shrinks) the light-responsive polymer 450 on the area 422b such that the cord 422T contracts (i.e., decreases in length) and the angle of attack θ increases from $θ_1$ (FIG. 6A) to $θ_2$.

Referring to FIG. 6C, light 462 from a light source (e.g., light source 460) is illustrated illuminating the area 422a on the cord 422L and such illumination activates and contracts (shrinks) the light-responsive polymer 450 on the area 422a such that the cord 422L contracts (i.e., decreases in length) and the angle of attack θ decreases from $θ_2$ (FIG. 6A) to $θ_0$.

Referring to FIG. 6D, light 462 from a light source (e.g., light source 460) is illustrated illuminating the light-responsive polymer 450 on one of the cords 422T and such illumination activates and contracts (shrinks) the light-responsive polymer 450 such that the cord 422T contracts. Also, light 472 from another light source (e.g., light source 470) is illustrated illuminating the light-responsive polymer 450 on the outer covering 410 and such illumination activates and contracts (shrinks) the light-responsive polymer 450 such that the outer covering 410 contracts. Accordingly, activation of the light-responsive polymer 450 at different areas or regions on the morphing aerodynamic structure 40 provides for control of the angle of attack angle θ, roll, pitch, and/or yaw of body 400 without the use of a mechanical or pneumatic system. And while not shown in FIGS. 6A-6D, in some variations one or more heating elements 455 (FIG. 5) heat the light-responsive polymer 450 above its de-activation temperature to assist in the control of the angle of attack angle θ, roll, pitch, and/or yaw of body 400 without the use of a mechanical or pneumatic system.

Figure 7:
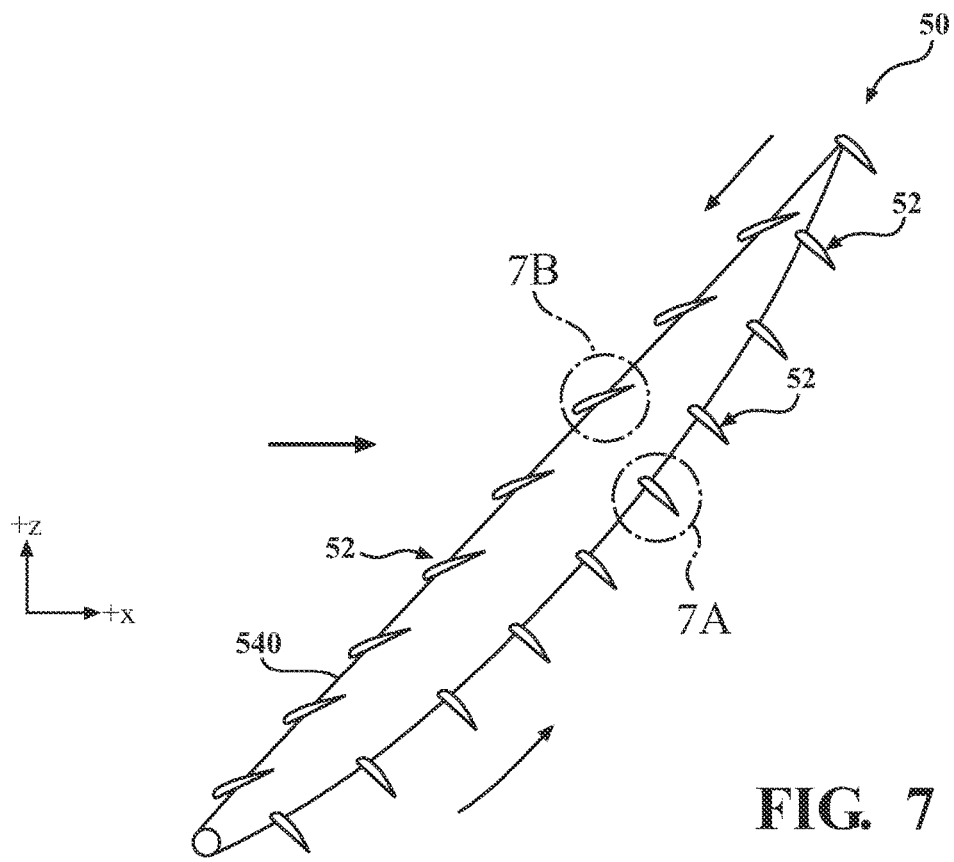
FIG. 7 shows a side view of a plurality of morphing aerodynamic structures in a ladder mill configuration according to the teachings of the present disclosure.
Figure 7A:
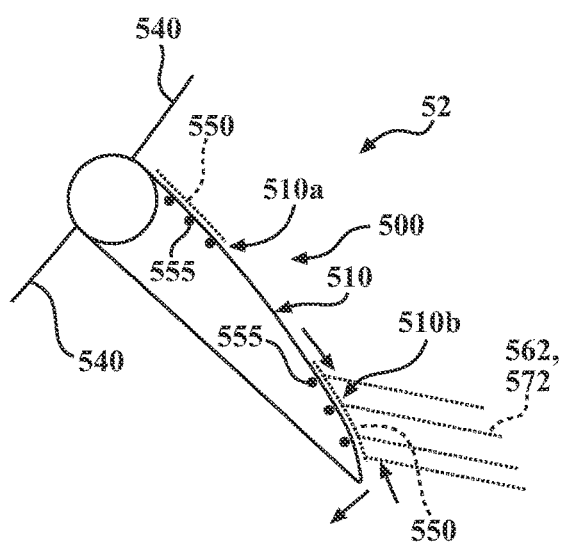
FIG. 7A shows an enlarged view of section 7A in FIG. 7.

Referring now to FIG. 7, a morphing aerodynamic structure system 50 according to the teachings of the present disclosure is shown. The morphing aerodynamic structure system 50 (also known as a ladder mill aerodynamic structure) includes a plurality of morphing aerodynamic structures 52 tethered together with a tether 540. The morphing aerodynamic structures 52 individually include a body 500 with an outer covering 510 and the outer covering 510 includes one or more areas (e.g., 510a, 510b, among others) with a light-responsive polymer 550 disposed thereon or made therefrom as illustrated in FIG. 7A. That is, one or more areas or sections of the outer coverings 510 include a light-responsive polymer 550 disposed thereon and/or are formed from the light-responsive polymer 550. And in at least one variation, the entirety of the outer covering is formed from the light-responsive polymer 550.

Figure 7B:
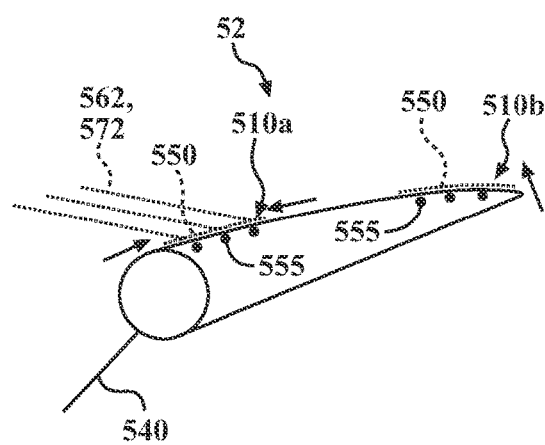
FIG. 7B shows an enlarged view of section 7B in FIG. 7.

In operation, the morphing aerodynamic structures 52 on a trailing side (+x direction) of the morphing aerodynamic structure system 50 are controlled to have a relatively large angle of attack for a reel-out stage and the morphing aerodynamic structures 52 on a leading side (−x direction) of the morphing aerodynamic structure system 50 are controlled to have a relatively small angle of attack for a reel-in stage. For example, and with reference to FIG. 7A, light 562 and/or light 572 from a light source(s) illuminates the area 510*b* and such illumination activates and contracts (shrinks) the light-responsive polymer 550 disposed on the area 510*b*. Accordingly, the area 510*b* contracts and the angle of attack of the morphing aerodynamic structure 52 increases for the reel-out stage. And with reference to FIG. 7B, light 562 and/or light 572 from a light source(s) is illustrated illuminating the area 510*a* and such illumination activates and contracts (shrinks) the light-responsive polymer 550 disposed on the area 510*a*. Accordingly, the area 510*a* contracts and the angle of attack of the morphing aerodynamic structure 52 decreases for the reel-in stage. Accordingly, the outer covering 510 changes shape without the use of a mechanical or pneumatic system. And similar to the heating elements described above, one or more heating elements 555 can be included such that the light-responsive polymer 550 can be heated above its de-activation temperature and return to its original shape.

Figure 8:
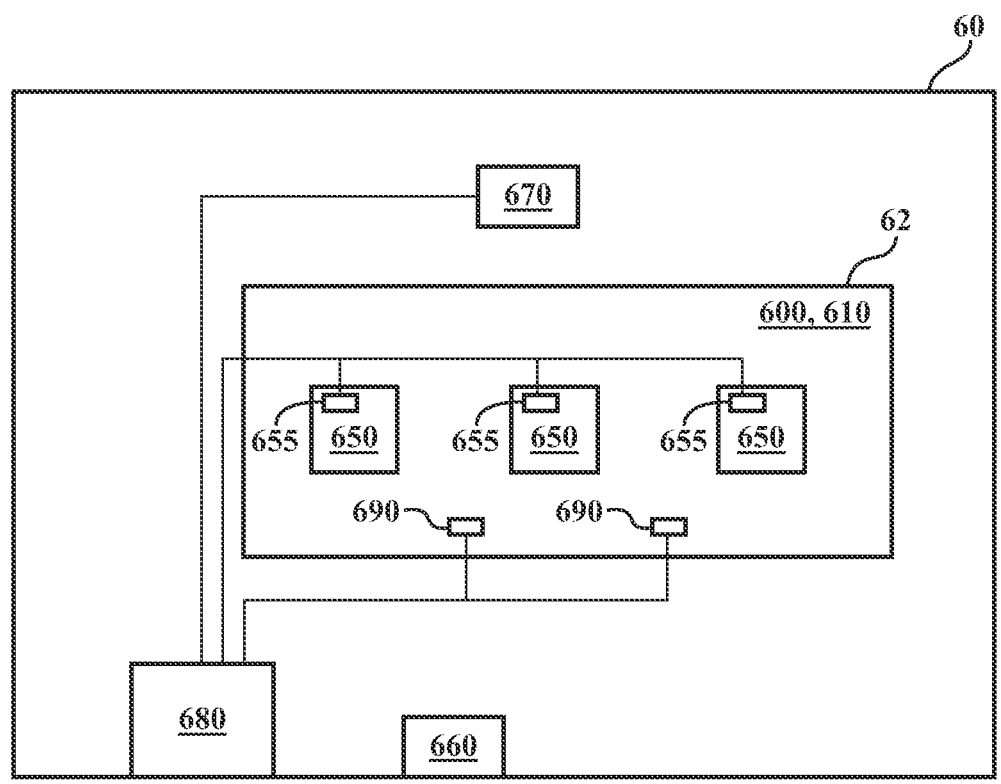
FIG. 8 is a block diagram for a morphing structure system according to the teachings of the present disclosure.

Referring now to FIG. 8, a block diagram for a morphing structure system 60 is shown. The morphing structure system 60 includes a morphing structure 62 with a body 600 having an outer covering 610. In some variations the morphing structure 62 is a morphing aerodynamic structure, while in other variations the morphing structure 62 is not a morphing aerodynamic structure. The outer covering 610 includes one more areas (not labeled) with a light-responsive polymer 650 disposed thereon. In some variations, the light-responsive polymer 650 is disposed on an entirety of the outer covering 610 and in at least one variation, the outer covering 610 is made from the light-responsive polymer 650.

The morphing structure system 60 also includes at least one artificial light source 660, 670 spaced apart from the morphing structure 62 and in communication with a controller 680. In some variations, one or more heating elements 655 are included and in communication with the controller, and in at least one variation one or more sensors 690 in communication with the controller 680 are included and configured to monitor the shape of the morphing structure 62 and/or detect a change in shape of the morphing structure 62.

In operation, the controller 680 commands the light source 660 and/or the light source 670 to illuminate the light-responsive polymer 650 on one or more areas of the outer covering 610 such that the light-responsive polymer 650 and the corresponding area change shape (e.g., contract) and the morphing structure 62 moves from a first shape to one or more desired second shapes. And in some variations, the controller 680 commands one or more of the heating elements 655 to heat one or more respective areas of the outer covering 610, and the light-responsive polymer 650 disposed thereon, above a predefined de-activation temperature such that the morphing structure 62 moves from one or more desired second shapes to one or more desired third shapes (e.g., back to the first shape). In this manner the morphing structure system 60 is configured to control the shape and/or flight path the morphing structure 62.

Figure 9:
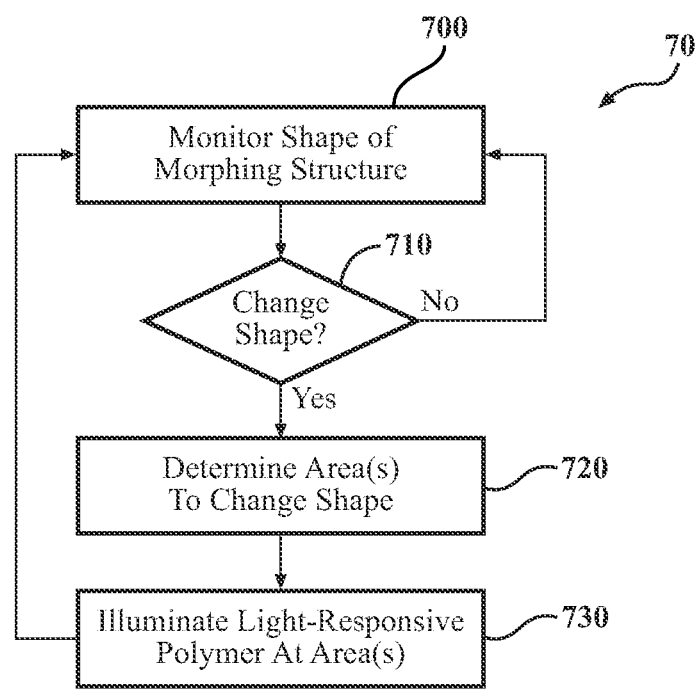
FIG. 9 is a flow chart for a method of controlling a morphing structure according to the teachings of the present disclosure.

Referring now to FIG. 9, a method 70 for controlling the shape of a morphing structure as described above includes monitoring the shape at 700 and determining whether or not the shape should be changed at 710. In some variations, the shape is monitored using one or more sensors disposed on and/or attached to the morphing structure, and the one or more sensors can be in communication with a controller configured to receive signals from the one or more sensors. And in at least one variation, whether or not the shape of the morphing structure should be changed is determined by the controller. If a change in the shape of the morphing structure is not desired, the method 70 returns to 700 where continued monitoring of the morphing structure continues and this cycle, i.e., 700-710-700, continues until the shape of the morphing structure is determined to be changed at 710. The method 70 then continues to 720 and determines which area or areas of the morphing structure should be changed. In some variations, the controller determines which area or areas of the morphing structure should be changed and to what extent or how much the shape of the area or areas should be changed.

The method 70 then continues to 730 where light-responsive polymer disposed on the determined area or areas is illuminated with a light source such that the light-responsive polymer and the corresponding area or areas change shape as desired. The method returns to 700 where continued monitoring of the morphing shape occurs and determination of whether or not additional changing of the shape is desired at 710. This cycle, i.e., 700-710-720-730-700 continues until a desired shape of the morphing structure is provided.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A morphing aerodynamic structure comprising:
   a body with an outer covering;
   a bridle attached to the body; and
   a light-responsive polymer disposed on the bridle, the light-responsive polymer configured to change shape when illuminated with a laser such that the bridle changes shape and at least one of an angle of attack, roll, pitch, and yaw of the morphing aerodynamic structure is controlled when the light-responsive polymer is illuminated with the laser.

2. The morphing aerodynamic structure according to claim 1 further comprising the light-responsive polymer being disposed on the outer covering such that a shape of the outer covering changes when the light-responsive polymer disposed on the outer covering is illuminated with the laser.

3. The morphing aerodynamic structure according to claim 2, wherein the light-responsive polymer disposed on the outer covering is disposed on an outer surface of the outer covering.

4. The morphing aerodynamic structure according to claim 2, wherein the light-responsive polymer disposed on the outer covering is disposed on an inner surface of the outer covering.

5. The morphing aerodynamic structure according to claim 1, wherein the bridle comprises a plurality of cords and the light-responsive polymer is disposed on at least one of the plurality of cords.

6. The morphing aerodynamic structure according to claim 1 further comprising a land-based laser configured to illuminate the light-responsive polymer disposed on the bridle with the laser.

7. The morphing aerodynamic structure according to claim 1 further comprising an air-based laser configured to illuminate the light-responsive polymer disposed on the bridle with the laser.

8. The morphing aerodynamic structure according to claim 1, wherein the body with the outer covering and the bridle attached to the body form a kite.

9. The morphing aerodynamic structure according to claim 8 further comprising a tether and a ground-based electric generator, wherein the tether extends between the bridle and the ground-based electric generator.

10. The morphing aerodynamic structure according to claim 9 further comprising a heating element configured to heat the light-responsive polymer disposed on the bridle.

11. The morphing aerodynamic structure according to claim 10, wherein the heating element is disposed on the light-responsive polymer disposed on the bridle.

12. The morphing aerodynamic structure according to claim 11, wherein the heating element is configured to heat the light-responsive polymer disposed on the bridle above a de-activation temperature of the light-responsive polymer.

13. The morphing aerodynamic structure according to claim 12, wherein the heating element is configured to heat the light-responsive polymer disposed on the bridle above the de-activation temperature such that the bridle changes from a first shape to a second shape different from the first shape.

14. A morphing aerodynamic structure comprising:
a body with an outer covering;
a bridle attached to the body;
a light-response polymer disposed on at least one of an outer surface and an inner surface of the outer covering such that a roll, pitch and yaw of the morphing aerodynamic structure is controlled when the light-responsive polymer is illuminated with a laser; and
an air-based laser separate from the body configured to illuminate the light-responsive polymer with the laser, wherein the air-based laser is a balloon-based laser.

15. The morphing aerodynamic structure according to claim 14 further comprising a land-based laser configured to illuminate the light-responsive polymer with the laser.

16. A morphing aerodynamic structure comprising:
a body with an outer covering;
a bridle attached to the body;
a light-response polymer disposed on the bridle and at least one of an outer surface and an inner surface of the outer covering such that a roll, pitch and yaw of the morphing aerodynamic structure is controlled when the light-responsive polymer is illuminated with a laser; and
a land-based laser configured to illuminate the light-responsive polymer with the laser.

17. The morphing aerodynamic structure according to claim 16 further comprising an air-based laser configured to illuminate the light-responsive polymer with another laser.

\* \* \* \* \*